United States Patent [19]

Stang et al.

[11] Patent Number: 4,976,225
[45] Date of Patent: Dec. 11, 1990

[54] CYLINDER HEAD GASKET FOR AN INTERNAL COMBUSTION ENGINE

[75] Inventors: John H. Stang; Christine H. Moore; Rien Ouwerkerk, all of Columbus, Ind.

[73] Assignee: Cummins Engine Company, Inc., Columbus, Ind.

[21] Appl. No.: 448,727

[22] Filed: Dec. 11, 1989

[51] Int. Cl.⁵ ............................................. F02B 75/18
[52] U.S. Cl. ............................... 123/41.74; 277/235 B
[58] Field of Search .......... 123/41.72, 41.74, 41.82 R, 123/193 CH; 277/166, 199, 235 B

[56] References Cited

U.S. PATENT DOCUMENTS

| | | |
|---|---|---|
| 1,935,552 | 11/1933 | Fitzgerald . |
| 2,828,988 | 4/1958 | Gorsica et al. . |
| 2,972,341 | 2/1961 | Forst .................... 123/41.72 |
| 3,191,950 | 6/1965 | Hiltner . |
| 3,352,564 | 11/1967 | Johnson . |
| 3,467,398 | 9/1969 | Bernard . |
| 3,473,813 | 10/1969 | Meyers et al. . |
| 3,532,349 | 10/1970 | Czernik . |
| 3,606,361 | 9/1971 | Pohl et al. . |
| 4,312,512 | 1/1982 | Conte et al. . |
| 4,376,539 | 3/1983 | Baldacci ............... 277/235 B |

FOREIGN PATENT DOCUMENTS 59-28052  2/1984  Japan ................ 277/235 B

Primary Examiner—Noah P. Kamen
Attorney, Agent, or Firm—Neuman, Williams, Anderson & Olson

[57] ABSTRACT

A cylinder head gasket for an internal combustion engine is provided having a single first section of a hard gasket material, and a single second section of relatively soft gasket material which is disposed in spaced encompassing relation with the periphery of the first section. The first and second sections coact to form a narrow gap which substantially coincides with the peripheral configuration of the first section. At predetermined locations within the gap, the sections are interconnected whereby the sections will remain in assembled relation at least while the gasket is being positioned between the engine block and cylinder head of the internal combustion engine.

6 Claims, 1 Drawing Sheet

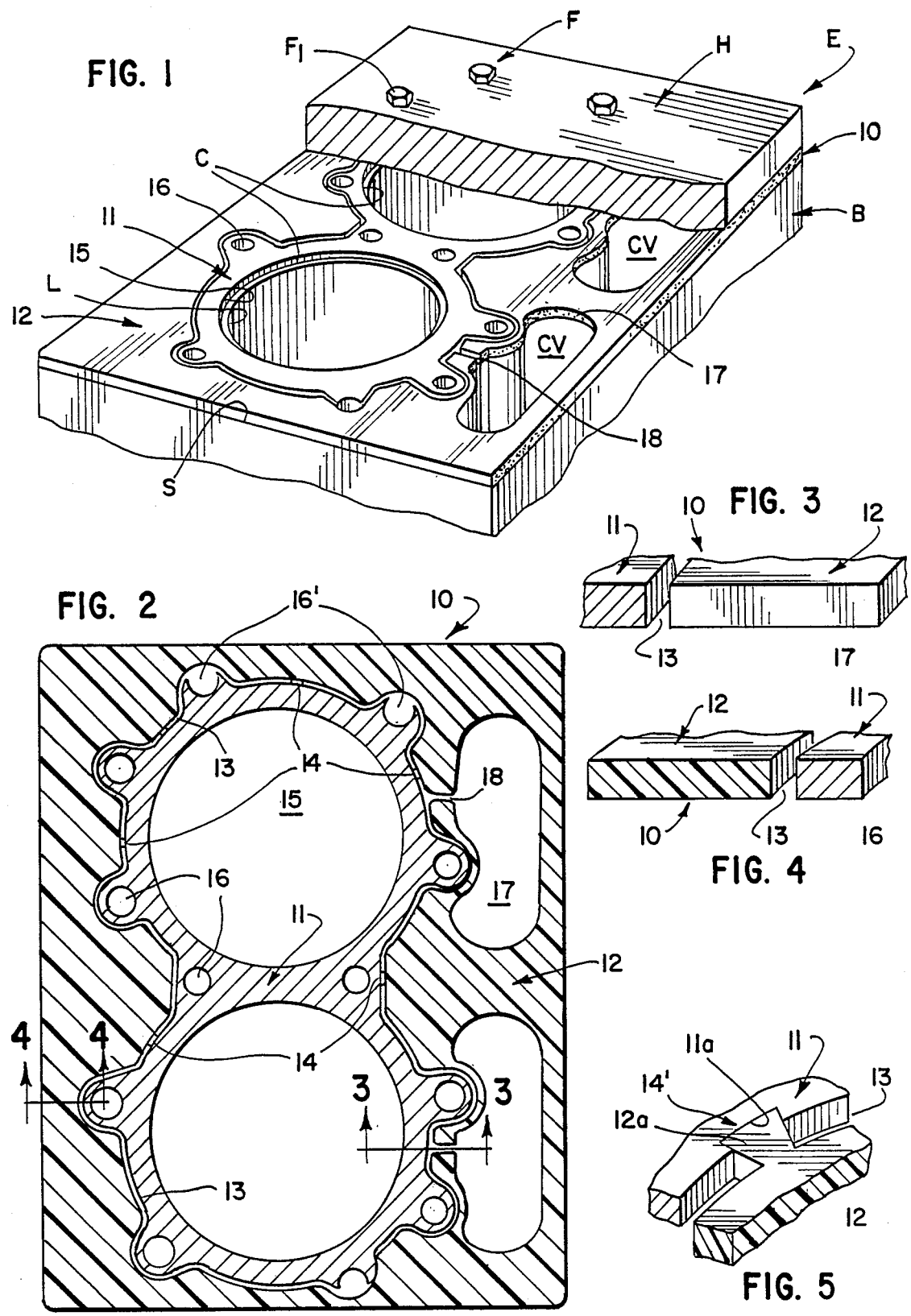

CYLINDER HEAD GASKET FOR AN INTERNAL COMBUSTION ENGINE

BACKGROUND OF THE INVENTION

In high compression internal combustion engines, it has been difficult to provide an effective cylinder head gasket which is capable of withstanding the high combustion pressures and temperatures to which it is subjected and yet is of simple, durable and inexpensive construction. Numerous prior gaskets of this general type were susceptible to an inordinate amount of wear because of the difficulty in obtaining a rigid joint particularly in the vicinity of the ends of the cylinders formed in engine block. As a result, relative motion would occur between the cylinder head, gasket and engine block. Such motion produced rapid deterioration of the gasket resulting in premature failure thereof.

Composite gaskets have been developed in an effort to correct this problem; however, because of the complexity of construction they were difficult and costly to produce. Furthermore, an inordinate amount of torque applied to cap-screws and the like was required in order to attain the proper amount of compression of the prior composite gaskets. Lastly, the installation of the prior composite gaskets sometimes becomes an awkward and frustrating manipulation because of the numerous components comprising the gasket.

SUMMARY OF THE INVENTION

Thus, it is an object of the invention to provide an improved cylinder head gasket which is not beset with any of the aforenoted problems associated with prior gaskets of this general type.

It is a further object to provide an improved cylinder head gasket which is of simple, inexpensive and durable construction.

Further and additional objects will appear from the description, accompanying drawings, and appended claims.

In accordance with one embodiment of the invention a cylinder head gasket for an internal combustion engine is provided. The gasket is adapted to overlie a surface of the engine block in which it formed a plurality of cylinders having oil-cooled liners mounted therein and at least one oil-collecting cavity spaced from the ends of the cylinders and associated liners. The gasket is compressed between the block surface and a cylinder head. The head and gasket are secured in place relative to the block surface by a plurality of fastening means, at least some of which are in proximity to the cylinder and associated liner ends. The gasket includes a single first section made of relatively hard gasket material which is adapted to simultaneously overlie the block surface portions circumjacent the cylinder ends and encompass the fastening means which are in proximity to the cylinder and associated liner ends. The gasket also includes a second section made of relatively soft gasket material. The second section is disposed in encompassing spaced relation with respect to the periphery of the first section and coacts therewith to form a narrow gap which coincides substantially with the peripheral configuration of the first section. The second section overlies the portions of the block surface circumjacent the oil collecting cavity and is provided with a channel which interconnects the gap with the cavity.

DESCRIPTION

For a more complete understanding of the invention reference is made to the drawings wherein FIG. 1 is a fragmentary top perspective view of an internal combustion engine provided with one embodiment of the improved cylinder head gasket and showing the cylinder head partially cut away to expose the gasket.

FIG. 2 is an enlarged top view of the improved cylinder head gasket per se shown in FIG. 1.

FIG. 3 is an enlarged fragmentary perspective sectional view of the improved gasket taken along line 3—3 of FIG. 2.

FIG. 4 is similar to FIG. 3 but taken along line 4—4 of FIG. 2.

FIG. 5 is an enlarged fragmentary sectional view similar to FIG. 3 of the improved gasket, but showing a modified way of interconnecting the first and second sections of the gasket.

Referring now to the drawings and more particularly to FIG. 1, a high compression internal combustion engine E (e.g., a two cylinder diesel engine) is shown which includes a block B having a surface S thereof in which is formed a plurality of cylinders C and a plurality of oil-collecting cavities CV which are in laterally spaced relation with respect to the cylinders C. The cavities communicate with the oil sump for the engines. Disposed within the cylinders are oil-cooled liners L. In addition, engine E includes a cylinder head H which is secured in super-imposed relation with respect to block surface S by a plurality of fasteners F such as cap-screws, anchor bolts or the like. All, or a certain number, of the fasteners F, are symmetrically arranged in proximity to the cylinders C. Additional fasteners $F_2$ may be utilized which are disposed proximate the outer periphery of the head. Compressed between the block surface S and head H is the improved gasket 10.

Gasket 10, as seen more clearly in FIG. 2, includes a first, or inner, section 11 which is formed of a relatively hard gasket material (e.g., sheet steel). The periphery of the first section 11 is encompassed in spaced relation by a second, or outer, section 12 which is formed of a relatively soft elastomeric material (e.g., EP/asbestos). Second section 12 coacts with the periphery of the first section 11 to form a narrow (e.g., up to 0.010" wide) gap 13 which substantially coincides with peripheral configuration of section 11.

The two sections are initially retained in assembled relation by a plurality of adhesive spots 14, FIG. 2, or by a tongue and groove combination 14', see FIG. 5. The spots 14 are heat sensitive and will disintegrate or become non-adhesive once the engine block heats up to or the ambient temperature exceeds a predetermined temperature (e.g., 300° F.). Initially, each glue spot spans the width of the gap and at ambient temperatures below 140° F. is possessed of sufficient adhesive strength and rigidity so as to retain the sections in assembled relation thereby facilitating handling of the gasket.

First section 11 is provided with primary openings 15 which are sized to coincide with the ends of the cylinders C formed in the surface S of the engine block B. In addition section 11 includes a plurality of secondary openings 16 which are sized to accommodate the shanks of the fasteners F, the latter securing the head H and gasket 10 in place on the block surface S. As noted in the FIG. 2 substantially all of the secondary openings 16, except for a few 16'; are encompassed by portions of the gasket first section 11. The number of secondary openings encompassed by the first section may vary from that shown and will depend upon the size of the engine on which the gasket is to be used, the relative location of the secondary openings with respect to the primary openings, and the combustion pressures and temperatures to which the gasket will be subjected.

The second section 12 of gasket 10 is also provided with primary openings 17 which are sized to conform to the shape of the cavities CV formed in block surface S. Each opening 17 communicates with gap 13 via a channel, or passage, 18 formed in the second section 12. The number of channels will normally correspond with the number of cavities. Thus, any combustion gases or liquid which might leak past the first section 11 will become entrapped in the gap 13 and then find its way to an adjacent cavity through the channel 18 associated therewith.

Where a tongue and groove combination 14' is utilized in place of glue spots in order to retain the sections in assembled relation, one of the sections (e.g., section 12) is provided with one or more tongues 12a which span the width of the gap 13 and interlockingly engage a complemental groove or slot 11a formed in the periphery of the other section (e.g., section 11). As illustrated, the tongue 12a may have a substantially keystone configuration and the groove 11a a similar configuration. Because the tongues 12a block the gap, it is necessary that they be positioned at predetermined locations within the gap so that all segments of gap will have access to a channel 18.

When the gasket 10 is being positioned on the block surface S, the first section 11 will simultaneously overlie the portion of the surface S which are circumjacent the ends of the cylinders C and associated liners L and the openings which accommodate the fasteners F. Because of the hardness of the section 11 material and the substantially uniform thickness of section 11, the compressive force exerted thereon by the head H, as torque is applied to the fasteners F, is substantially uniformly distributed throughout section 11 thereby producing a substantially rigid joint even though an inordinate amount of torque is not applied to the fasteners. Such a joint, eliminates or significantly reduces, relative movement of the head and gasket with respect to the block surface thereby materially prolonging the life of the gasket.

The second section 12 of the gasket, as aforementioned, is formed of a soft elastomeric material and will compensate for any surface irregularities of the head and block surface and thus, provide an effective fluid seal. Because the gap is exposed to the low pressure maintained in the oil sump of the engine, fluid leakage past the outer section 12 is insignificant.

The shape and size of the gasket may vary from that shown and the types of material utilized in forming the gasket components may vary from that described without departing from the scope of the invention. The improved gasket is of simple design, easily assembled on the block surface and is durable.

We claim:

1. A cylinder head gasket for disposition between adjacent surfaces of a block having a plurality of cylinders formed therein and a cylinder head of an internal combustion engine, the gasket being adapted to be compressed therebetween upon a predetermined torque being applied to a plurality of relatively spaced fastening means of the engine, the fastening means retaining the head and block in assembled relation; said gasket comprising a single first section of relatively hard gasket material and having an area for simultaneously overlying portions of the block surface circumjacent ends of the cylinders formed therein, the block surface portions being exposed to combustion temperatures and pressures when the engine is operating; a single second section of relatively soft gasket material disposed in spaced encompassing relation with respect to the periphery of said first section and coacting therewith to form a narrow gap substantially coinciding with the peripheral configuration of said first section; and means disposed at predetermined locations within said gap for effecting interconnection between said sections during initial placement of the gasket between the head and block.

2. The gasket of claim 1 wherein the engine block surface is provided with a liquid collecting cavity spaced from the cylinder ends and in communication with a liquid sump for the engine; the gasket second section being adapted to overlie portions of the block surface circumjacent the cavity, said second section having formed therein a channel for interconnecting said gap and the block cavity.

3. The gasket of claim 2 wherein the gasket first section is adapted to encompass predetermined fastening means in proximity to the cylinder ends and coact therewith to form a substantially rigid joint between the head and block in the vicinity of the cylinder ends.

4. The gasket of claim 1 wherein the means for interconnecting the first and second sections includes a plurality of relatively spaced spots of heat sensitive adhesive material which span the width of the gap and when subjected to an ambient temperature below a predetermined amount adhesively secure the sections in assembled relation, and when subjected to an ambient temperature above said predetermined amount will become non-adhesive.

5. The gasket of claim 1 wherein the means for interconnecting the first and second sections includes a predetermined number of tabs protruding from a gap-forming edge of one section and interlockingly engaging a corresponding number of complemental pockets provided in a gap-forming edge of the other section.

6. An internal combustion engine comprising an engine block having a surface thereof provided with a plurality of cylinders and an oil collecting cavity spaced from said cylinders, a plurality of oil-cooled liners mounted within said block cylinders and having corresponding ends thereof terminating at said block surface, a cylinder head mounted on said block surface and overlying corresponding ends of said cylinders and cylinder liners, a gasket interposed said block surface and cylinder head, and fastening means coacting with said block and cylinder head for compressing the gasket therebetween and retaining the block, gasket and cylinder head in assembled relation; said gasket including a single first section of relatively hard material having an area thereof simultaneously overlying portions of said block surface circumjacent said cylinder ends and encompassing predetermined fastening means in proximity to said cylinder ends, a single second section of relatively soft gasket material disposed in spaced encompassing relation with respect to the periphery of the first section and coacting therewith to form a narrow gap substantially coinciding with the peripheral configuration of said first section, said second section having an area thereof overlying portions of said block surface circumjacent said cavity, said second section provided with a channel interconnecting said gap and said cavity, and means disposed at predetermined locations within said gap for affecting interconnection between said sections during initial placement of the gasket between said block and cylinder head.

* * * * *